(12) United States Patent
Phelan

(10) Patent No.: US 7,550,519 B2
(45) Date of Patent: Jun. 23, 2009

(54) CURABLE COLORED INKS FOR MAKING COLORED SILICONE HYDROGEL LENSES

(75) Inventor: John Christopher Phelan, Gurnee, IL (US)

(73) Assignee: Novartis AG, Basel (CH)

( * ) Notice: Subject to any disclaimer, the term of this patent is extended or adjusted under 35 U.S.C. 154(b) by 98 days.

(21) Appl. No.: 11/110,059

(22) Filed: Apr. 20, 2005

(65) Prior Publication Data

US 2005/0237483 A1 Oct. 27, 2005

Related U.S. Application Data

(60) Provisional application No. 60/564,024, filed on Apr. 21, 2004.

(51) Int. Cl.
C09D 11/00 (2006.01)
C09D 11/10 (2006.01)
C08L 83/10 (2006.01)
G02B 1/04 (2006.01)

(52) U.S. Cl. .................. 523/160; 523/106; 523/105; 524/588

(58) Field of Classification Search .............. 504/588; 523/160
See application file for complete search history.

(56) References Cited

U.S. PATENT DOCUMENTS

| | | | |
|---|---|---|---|
| 3,476,499 A | 11/1969 | Wichterle | 8/4 |
| 3,536,386 A | 10/1970 | Spivak | 351/160 |
| 3,650,812 A * | 3/1972 | Nordstrom et al. | 442/63 |
| 3,679,504 A | 7/1972 | Wichterle | 156/62 |
| 3,712,718 A | 1/1973 | LeGrand et al. | 351/160 |
| 3,714,288 A * | 1/1973 | Nordstrom | 525/288 |
| 3,723,167 A * | 3/1973 | Nordstrom | 428/407 |
| 3,808,287 A * | 4/1974 | Thomas | 528/26 |
| 4,252,421 A | 2/1981 | Foley, Jr. | 351/162 |
| 4,405,773 A | 9/1983 | Loshaek et al. | 526/317 |
| 4,460,523 A | 7/1984 | Neefe | 264/1.9 |
| 4,468,229 A | 8/1984 | Su | 8/507 |
| 4,472,327 A | 9/1984 | Neefe | 264/1.9 |
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshaek | 8/507 |
| 4,704,017 A | 11/1987 | Knapp | 381/177 |
| 4,719,657 A | 1/1988 | Bawa | 8/453 |
| 4,744,647 A | 5/1988 | Meshel et al. | 381/177 |
| 4,857,072 A | 8/1989 | Narducy et al. | 8/507 |
| 4,954,132 A | 9/1990 | Hung et al. | 8/507 |
| 4,963,159 A | 10/1990 | Narducy et al. | 8/507 |
| 5,034,166 A | 7/1991 | Rawlings et al. | 264/1.7 |
| 5,091,440 A * | 2/1992 | Griswold | 522/99 |
| 5,116,112 A | 5/1992 | Rawlings | 351/162 |
| 5,120,121 A | 6/1992 | Rawlings et al. | 351/162 |
| 5,272,010 A | 12/1993 | Quinn | 428/411.1 |
| 5,336,797 A * | 8/1994 | McGee et al. | 556/419 |
| 5,414,477 A | 5/1995 | Jahnke | 351/162 |
| 5,452,658 A | 9/1995 | Shell | 101/401.1 |
| 5,637,265 A | 6/1997 | Misciagno et al. | 264/1.7 |
| 5,793,466 A | 8/1998 | Moncada | 351/162 |
| 5,936,705 A | 8/1999 | Ocampo et al. | 351/162 |
| 6,030,078 A | 2/2000 | Ocampo | 351/162 |
| 6,132,043 A | 10/2000 | Atkins et al. | 351/162 |
| 6,164,777 A | 12/2000 | Li et al. | 351/162 |
| 6,268,456 B1 * | 7/2001 | Gregorovich et al. | 528/35 |
| 6,284,161 B1 | 9/2001 | Thakrar et al. | 264/1.7 |
| 6,315,410 B1 | 11/2001 | Doshi | 351/162 |
| 6,337,040 B1 | 1/2002 | Thakrar et al. | 264/1.7 |
| 6,359,024 B2 | 3/2002 | Lai | 522/64 |
| 6,465,538 B2 | 10/2002 | Lai | 522/64 |
| 6,523,953 B2 | 2/2003 | Jahnke | 351/162 |
| 2001/0050753 A1 | 12/2001 | Tucker | 351/177 |
| 2002/0027638 A1 | 3/2002 | Thakrar et al. | 351/162 |
| 2002/0039172 A1 | 4/2002 | Ocampo et al. | 351/162 |
| 2003/0054109 A1 | 3/2003 | Quinn et al. | 427/385.5 |
| 2003/0071964 A1 | 4/2003 | Doshi | 351/159 |
| 2003/0119943 A1 | 6/2003 | Tucker et al. | 523/160 |

(Continued)

FOREIGN PATENT DOCUMENTS

EP 1 235 096 8/2002

(Continued)

OTHER PUBLICATIONS

International Search Report—Written Opinion.

(Continued)

*Primary Examiner*—Tae H Yoon
(74) *Attorney, Agent, or Firm*—Sheng-Hsin Hu; Jian Zhou

(57) ABSTRACT

The present invention provides an actinically or thermally curable ink for making colored silicone hydrogel contact lenses. The ink of the invention comprises at least one colorant, a solvent and a binder polymer including ethylenically unsaturated groups and segments derived from at least one silicone-containing vinylic monomer or macromer. The ink of the invention is characterized by having capability to be cured actinically or thermally to form a colored coat on a silicone hydrogel contact lens, wherein the colored coat has good adhesion to the silicone hydrogel contact lens without being covalently attached to the lens material of the contact lens. The invention also provides methods for making colored silicone hydrogel contact lenses.

8 Claims, 7 Drawing Sheets

U.S. PATENT DOCUMENTS

| | | | |
|---|---|---|---|
| 2003/0165015 | A1 | 9/2003 | Jahnke ........................ 359/581 |
| 2004/0001181 | A1 | 1/2004 | Kunzler et al. .............. 351/162 |
| 2004/0044099 | A1 | 3/2004 | Tucker et al. ................ 523/160 |
| 2005/0143547 | A1* | 6/2005 | Stark et al. .................... 528/25 |
| 2005/0218536 | A1* | 10/2005 | Quinn et al. .................. 264/1.7 |
| 2008/0143003 | A1* | 6/2008 | Phelan ...................... 264/1.36 |

FOREIGN PATENT DOCUMENTS

FR            1 499 774          11/1966

WO       WO 02/074186         9/2002

OTHER PUBLICATIONS

Standard Search Report.
Search Report I.
Search Report II.
Search Report III.
Search report IV.

* cited by examiner

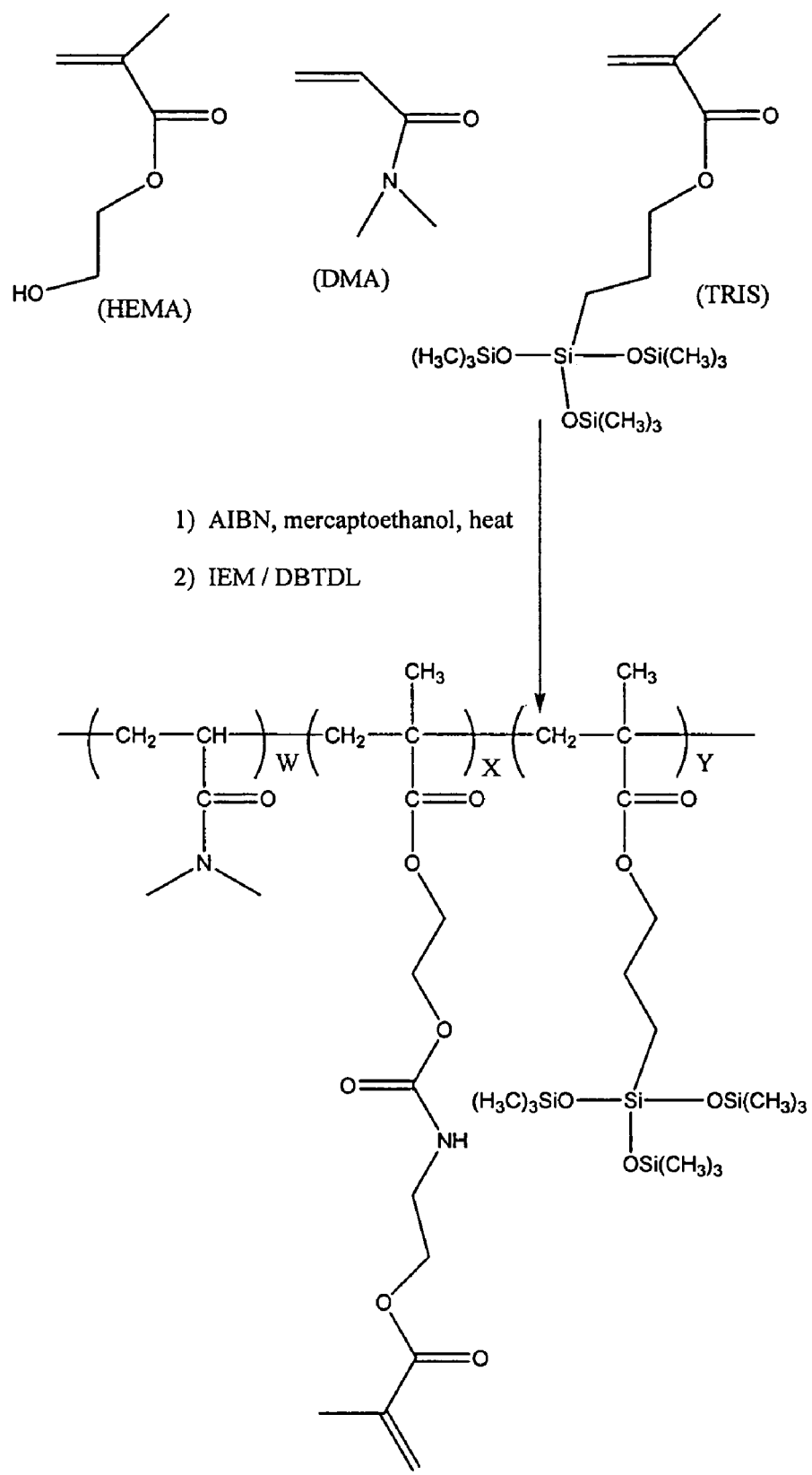
Scheme 1

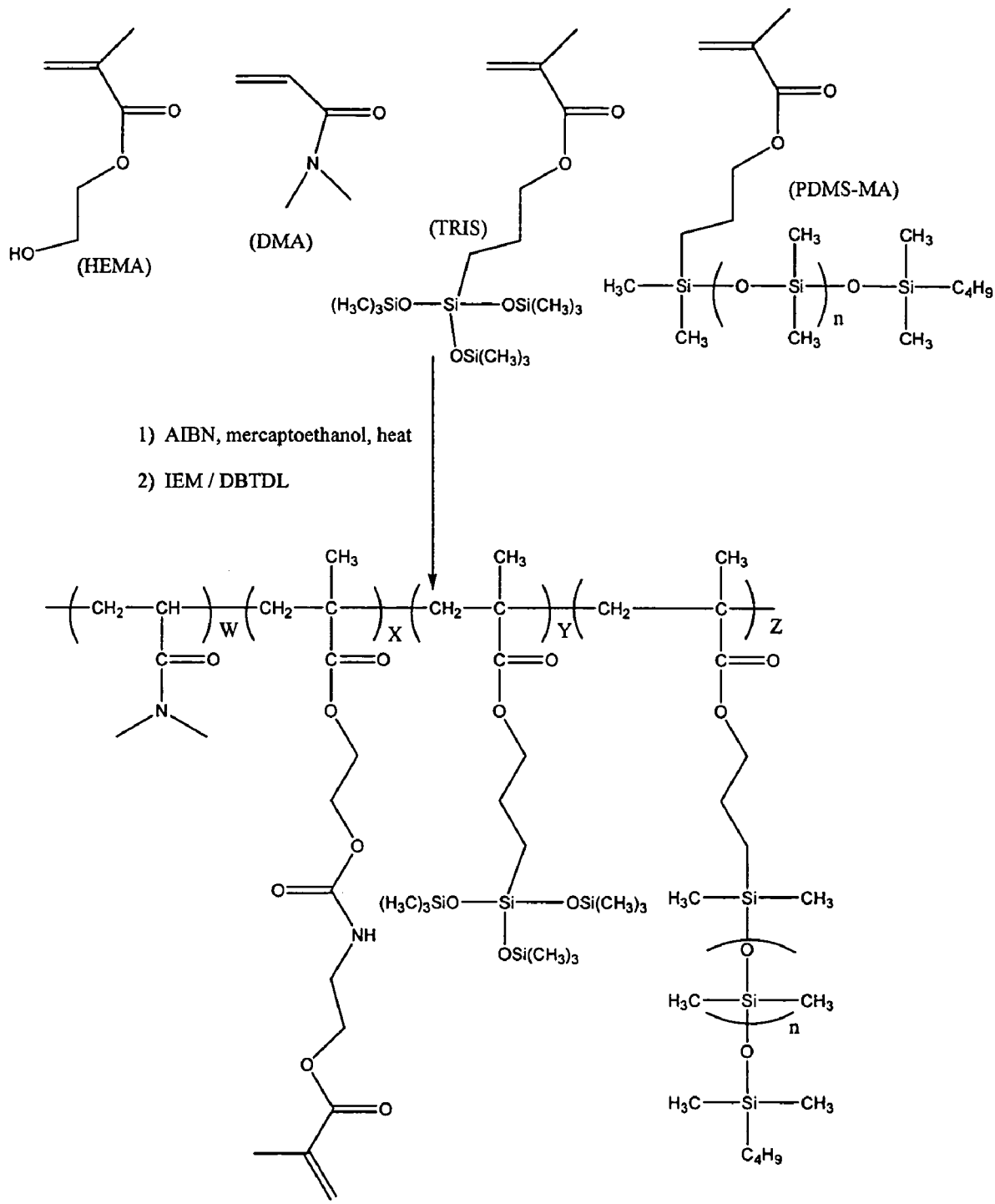
Scheme 2

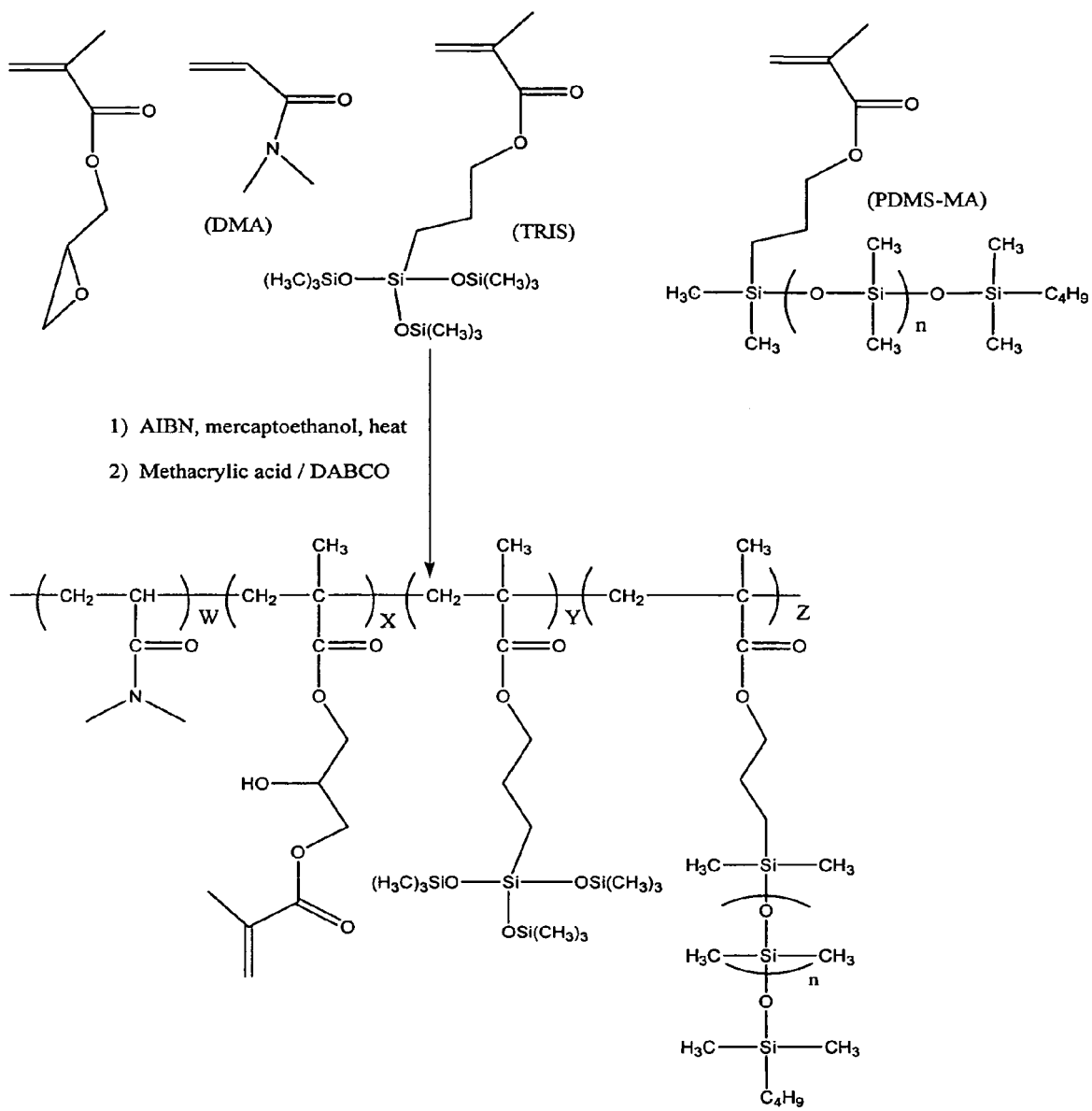
Scheme 3

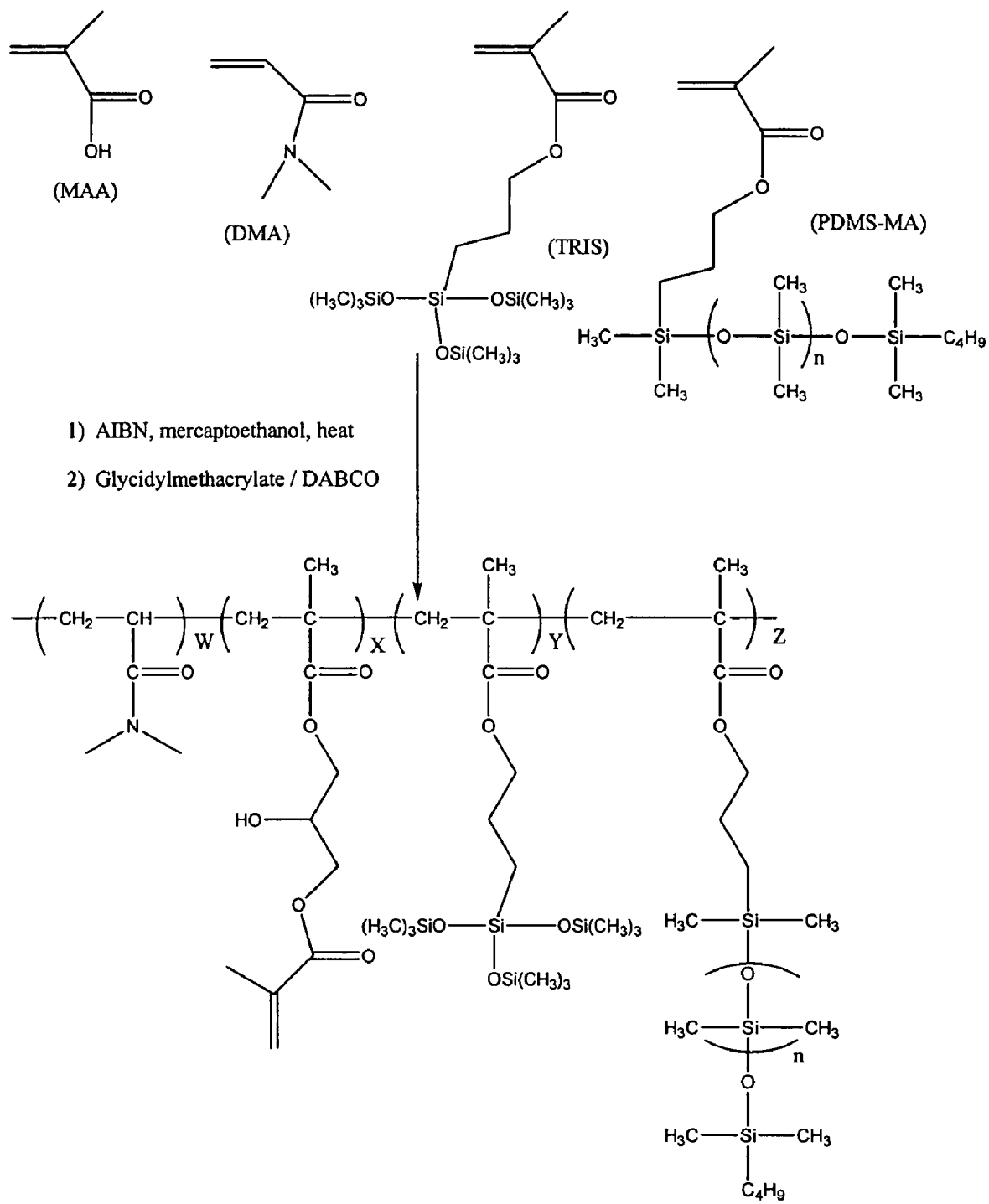
Scheme 4

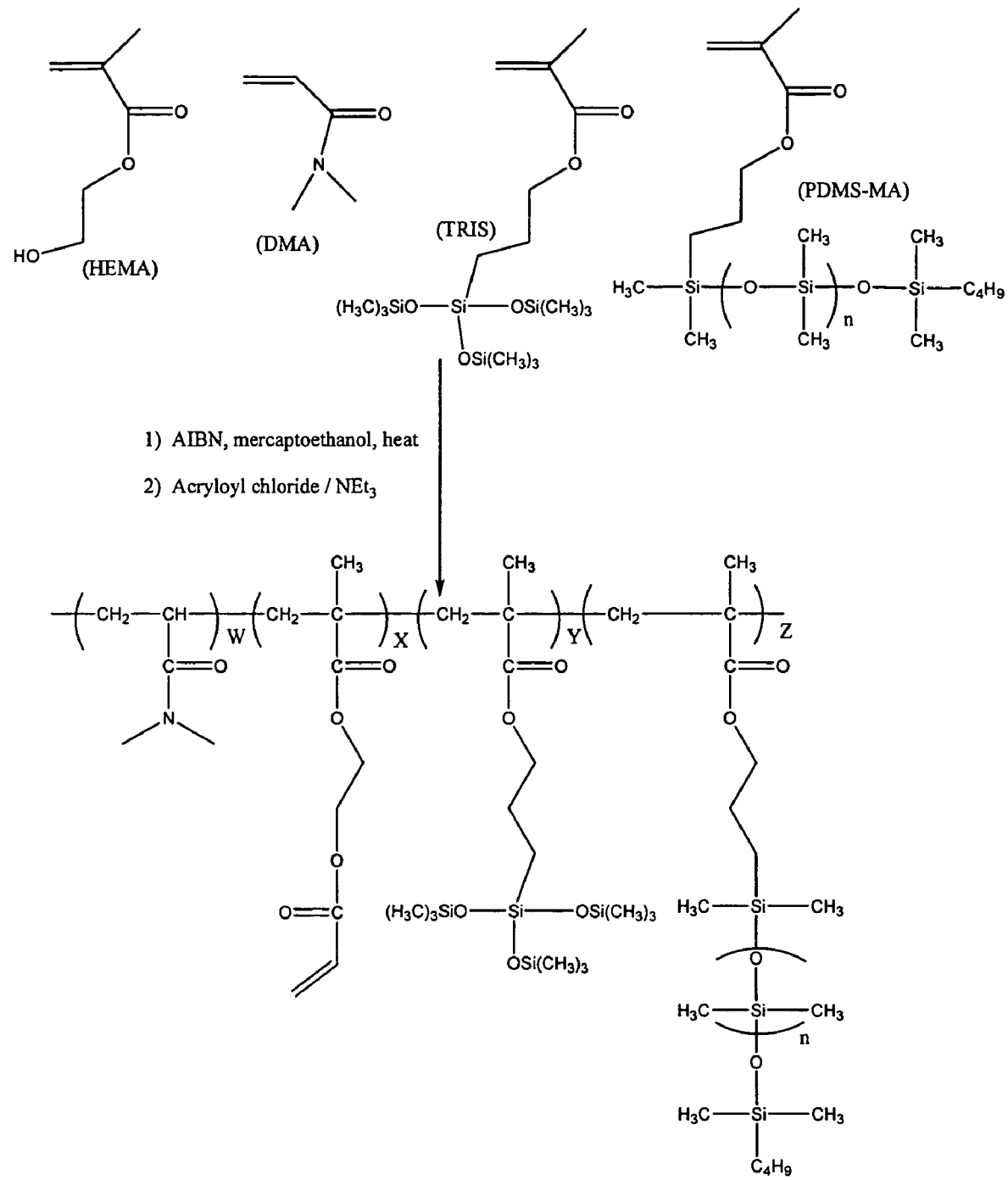
Scheme 5

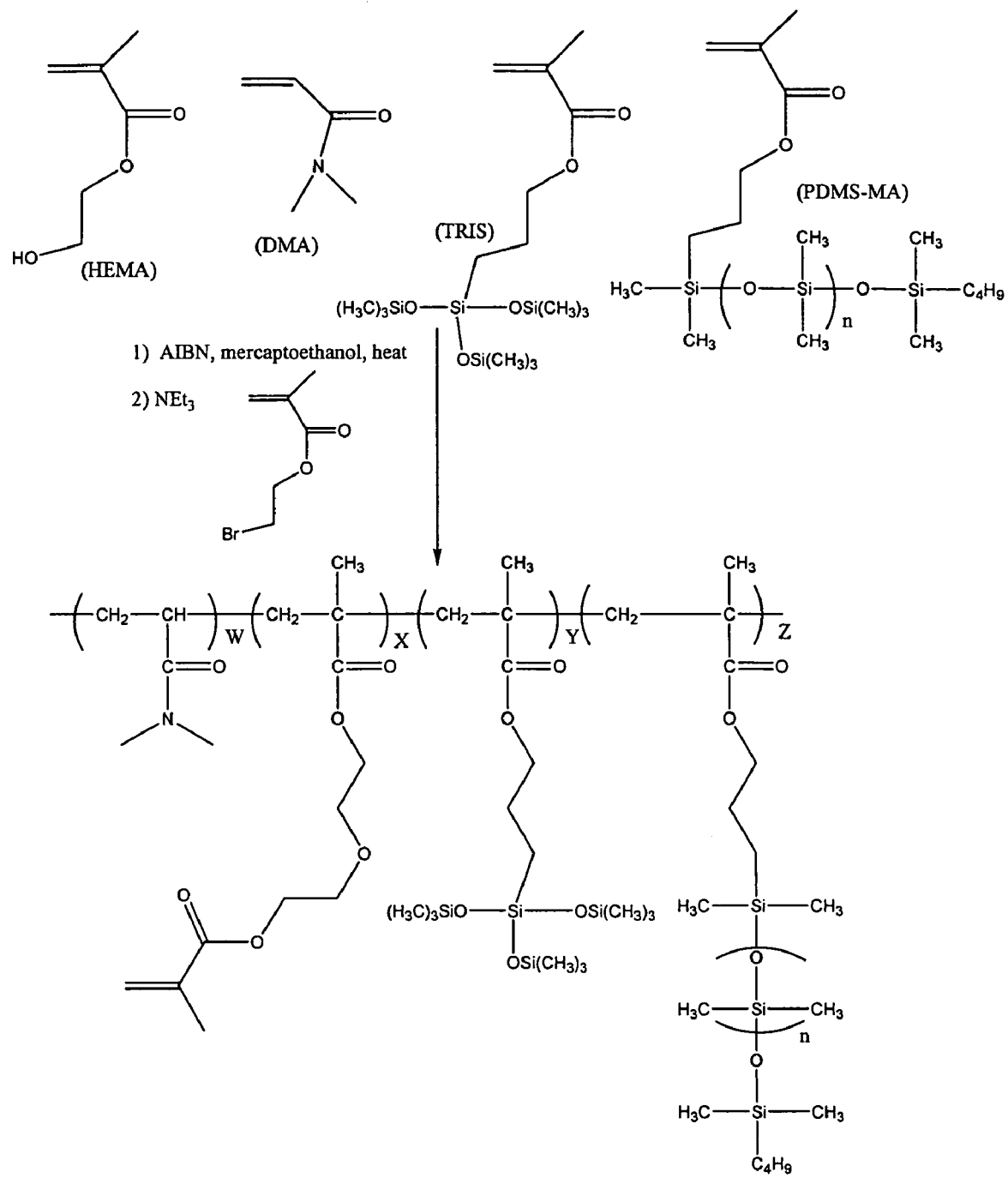
Scheme 6

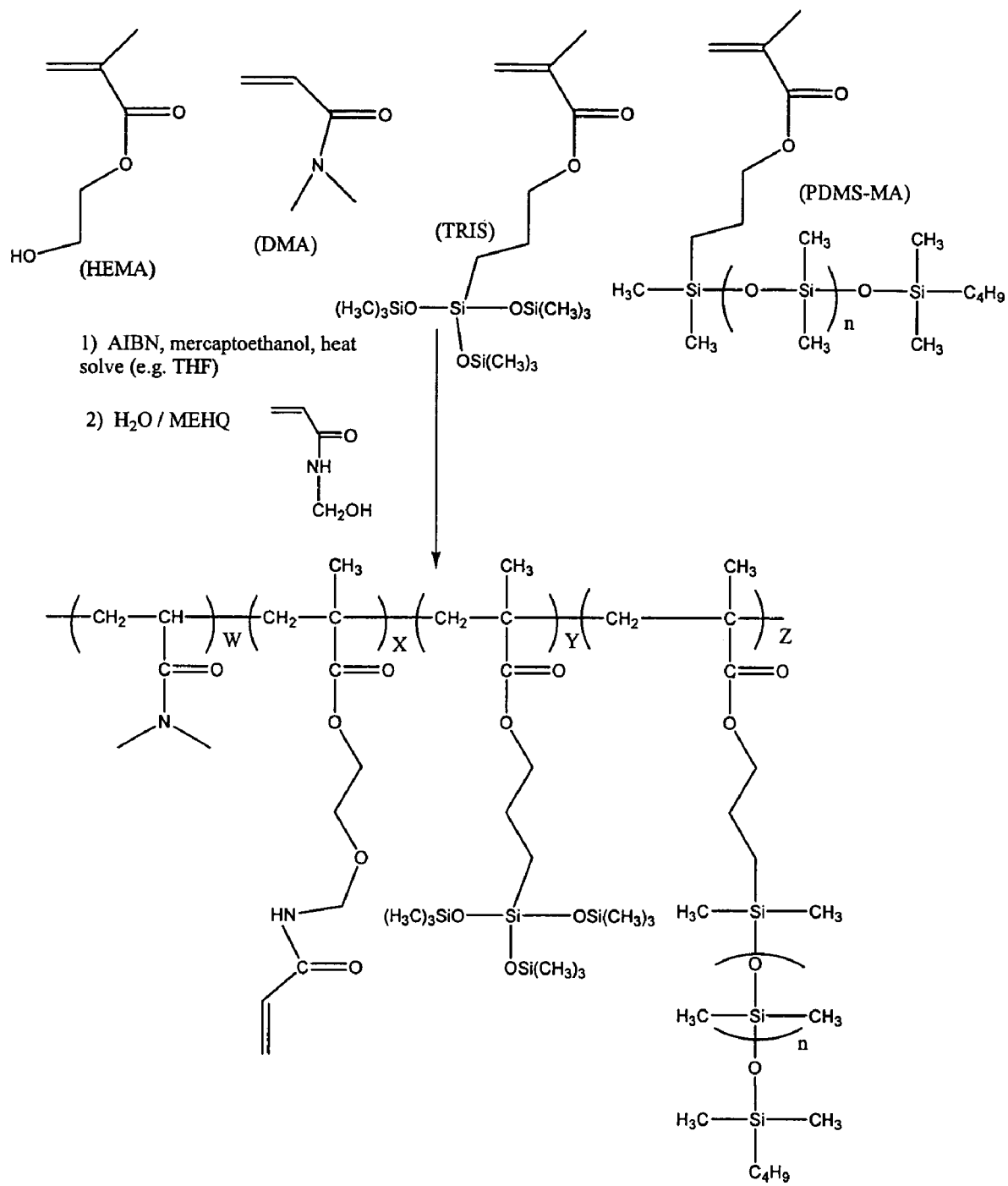
Scheme 7

CURABLE COLORED INKS FOR MAKING COLORED SILICONE HYDROGEL LENSES

This application claims the benefit under 35 USC § 119 (e) of U.S. provisional application No. 60/564,024 filed Apr. 21, 2004, incorporated herein by reference in its entirety.

The present invention is related to an actinically or thermally curable ink and methods for making colored contact lenses, in particular to colored silicone hydrogel contact lenses.

BACKGROUND OF THE INVENTION

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers. Various methods have been disclosed to make printing inks suitable for printing either hydrophilic (hydrogel) contact lenses or the molds that are then used to make hydrogel contact lenses.

U.S. Pat. No. 4,668,240 to Loshaek discloses colored contact lenses produced with a lens polymer that contains one or more of the functional groups —COOH, —OH, or —NH—R, wherein R is hydrogen or $C_1$ to $C_8$ alkyl. At least a portion of the surface of the lens is coated with a color coat comprising at least one pigment, binder polymer having the same functional groups, and an additional compound having at least two groups per molecule selected from at least one of —NCO and epoxy. The Loshaek patent discloses also that the lens polymer may contain one or more of the functional groups —NCO or epoxy whereas the binder polymer may contain one or more of the functional groups —COOH, —OH, or —NH—R. The lens and binding polymers are then bound to each other by the reaction of the groups —COOH, —OH, or —NH—R in the lens or the binder polymer and binding polymers with the groups —NCO or epoxy in the binder polymer or the lens.

U.S. Pat. No. 4,857,072 to Narducy, et al. discloses a method for making colored hydrophilic contact lenses. At least a portion of the surface of the lens is coated with a color coat comprising at least one pigment, binding polymer having functional groups, and an additional compound having at least two groups per molecule of —NCO. The coated lens is then subjected to conditions that cause the color coat to adhere to the lens.

U.S. Pat. No. 5,272,010 to Quinn discloses a method for preparation of colored contact lenses similar to that of U.S. Pat. Nos. 4,668,240 and 4,857,072 except that an isocyanate compound is not required. Instead, adhesion promoters such as hexamethoxymethylmelamine are used.

U.S. Patent Application publication No. 2003/0054109 to Quinn, et al. discloses a method for making colored hydrophilic contact lenses. At least a portion of a surface of a lens is coated with a color coat comprising at least one colorant, and a binder polymer having latent crosslinkable pendent groups (e.g., epoxy, hydroxy, alkenyl, isocyanate, peroxy, perester, anhydride, silane, and combinations thereof). The lens is then subjected to conditions that cause the color coat to adhere to the lens. In such method, inks are substantially free of a separate adhesion promoter species such as hexamethylene diisocyanate or hexamethoxymethylmelamine.

However, the methods known in the art have several disadvantages. First, inks described in the prior art are for non-silicone hydrogel lenses and would be undesirable for use with silicone hydrogels. In recent years, silicone hydrogel contact lenses, for example, Focus NIGHT & DAY™ (CIBA VISION), become more and more popular because of corneal health benefits provided by their high oxygen permeability and comfort. Inks described in the prior art have properties (e.g., surface energy, oxygen permeability, water content, expansion characteristics, etc.) which may not be compatible with silicone hydrogel lenses, since they are designed for conventional (non-silicone) hydrogels and not for silicone hydrogel lenses. They may have adverse effects to the properties of silicone-hydrogel lenses.

Second, inks described in the prior art may have issues of instability because of reactive functional groups present in adhesion promoter, activators (activating agent or agents), and binder polymers in the inks. Premature reactions may occur between the reactive functional groups, having a negative impact on print quality, ink pot life, and lens adhesion ability of the ink.

Third, inks described in the prior art may need to have an additional agent or a reactive coating to be added during the manufacturing process to promote adhesion of the color coat to a lens. This has all the disadvantages associated with adding an additional ingredient to a manufacturing process.

Fourth, inks described in the prior art may not provide a manufacturer flexbility for curing (gelling) inks or promoting lens adhesion of a color coat. For example, thermal curing is often performed after printing an ink on one of the molding surfaces of a plastic (e.g., polypropylene) disposable mold. Thermally curing of an ink on a plastic disposable mold prior to lens fabrication might distort the mold and result in a lens of unacceptable quality. In addition, thermal curing of an ink might result in thermal oxidative processes involving polypropylene mold surfaces. As such, thermal curing may negatively affect on cure kinetics and lens quality.

Therefore, there exist needs for methods of making colored silicone hydrogel contact lenses, and for inks suitable for printing a high-quality color image on a silicone hydrogel contact lens.

SUMMARY OF THE INVENTION

The present invention address at least one or more deficiencies of the prior art.

In one aspect, the present invention provides an ink for making colored contact lenses, in particular, colored silicone hydrogel contact lenses. The ink of the invention comprises at least one colorant, a solvent and a binder polymer including ethylenically unsaturated groups and segments derived from at least one silicone-containing vinylic monomer or macromer, wherein the ink is characterized by having capability to be cured actinically or thermally to form a colored coat on a contact lens, wherein the colored coat has good adhesion to the contact lens without being covalently attached to the lens material of the contact lens.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink comprising at least one colorant and a photo-curable or thermo-curable binder polymer which comprises ethylenically unsaturated groups and segments derived from at least one silicone-containing vinylic monomer or macromer; and (c) curing the ink, thereby causing the color coat to adhere to the lens.

In a further aspect, the present invention comprises a method for making a colored silicone hydrogel contact lens, comprising the steps of: (a) applying a color coat to at least a portion of at least one of molding surfaces of a lens mold with an ink comprising at least one colorant and a photo-curable or thermo-curable binder polymer which comprises ethylenically unsaturated groups and segments derived from at least one silicone-containing vinylic monomer or macromer, wherein the mold has a lens-forming cavity between the molding surfaces, wherein the colored coat contains a first surface exposed to the interior of the lens-forming cavity and a second surface in contact with the molding surface; (b) dispensing a lens-forming material into the lens-forming cavity of the mold while maintaining substantially the color coat in position; (c) curing the lens-forming material within the lens-forming cavity to form the contact lens, whereby the colored coat detaches from the molding surface and becomes integral with the body of the contact lens.

In still a further aspect, the present invention provides a method of making a colored contact lens with an image embedded therein. This method comprises the steps of: (a) applying a color coat to at least a portion of at least one of molding surfaces of a lens mold with an ink comprising at least one colorant and a photo-curable or thermo-curable binder polymer, wherein the mold has a lens-forming cavity between the molding surfaces; (b) thermally or actinically curing the colored coat to form a colored film which is not covalently attached to any molding surfaces; (c) dispensing a lens-forming material into the lens-forming cavity of the mold; (d) letting the lens-forming material to soak the colored film for a period of time sufficient so that a portion of the lens-forming material penetrates into space between the colored film and the molding surface while detaching the colored film from the molding surface; (c) curing the lens-forming material within the lens-forming cavity to form the contact lens, whereby the colored film is embedded within the body of the contact lens between the anterior and posterior surfaces of the colored contact lens.

BRIEF DESCRIPTION OF THE DRAWINGS

Schemes 1-7 depict method for synthesis of various photo-curable ink binder for making colored silicone hydrogel lenses according to preferred embodiments of the invention. Any number of solvents (e.g. Toluene, THF, chloroform, methylene chloride, dimethylformamide, ethyl acetate, butyl acetate, cyclopentanone, ethyl lactate) could be utilized in polymer syntheses. Abbreviations of materials listed in the Schemes are: DMA=N,N-dimethylacrylamide; HEMA=2-Hydroxyethylmethacrylate; MAA=Methacrylic acid; TRIS=3-methacryloxypropyl-tris(trimethylsiloxy)silane; PDMS-MA=Monomethacryloxypropyl terminated polydimethylsiloxane; IEM=2-isocyanatoethylmethacrylate; DABCO=1,4-diazobicyclo[2.2.2]octane; DBTDL=Dibutyltindilaurate; AIBN=2,2'-azobis(isobutyronitrile).

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

"Colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors. "Additional manufacturers of pearlescent colorants are: Kemira, Inc. in Savannah, Ga., the pigments having the trade name" Flonac Lustre Colors"; and EM Industries, Inc. of Hawthorne, N.Y., the pigments having the trade name "Affair Lustre Pigments".

"Stable" in reference to an ink, as used herein, means that no liquid phase separation and/or pigment precipitation and/or increase of viscosity occurs over a specific time period. A stable ink can provide more flexibility in producing colored ophthalmic lenses.

As used herein, the term "good adhesion to a medical device" in reference to an ink means that a color image printed with the ink on a contact lens can pass at least a finger rubbing test, preferably pass the finger rubbing test and a sterilization-surviving test.

"A binder polymer" refers to a crosslinkable polymer that can be crosslinked by a crosslinker or upon initiation by a chemical or physical means (e.g., moisture, heating. UV irradiation or the like) to trap or bind colorants onto or into a medical device (preferably a contact lens) such as that term is known in the art.

The term "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers, macromers and or oligomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

In one aspect, the present invention provides an ink for making colored contact lenses, in particular, colored silicone hydrogel contact lenses. The ink of the invention comprises at least one colorant, a solvent and a photo-curable or thermo-curable binder polymer including ethylenically unsaturated groups and segments derived from at least one silicone-containing vinylic monomer or macromer.

The ink of the invention is actinically or thermally curable to form a colored coat on a contact lens or a molding surface of a mold.

The ink of the present invention also has good adhesion to a contact lens, preferably to a silicone hydrogel contact lens. As used herein, "good adhesion to a contact lens or a silicon hydrogel contact lens" in reference to a colored coat or an ink means that the colored coat (with a color image) generated on the lens with the ink can pass at least a finger rubbing test, preferably pass the finger rubbing test and a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

The sonication-in-methanol (or other suitable solvent, e.g., such as isopropanol) test is performed as follows. A colored contact lens is immersed in 5 ml of, for example, methanol or isopropanol or a suitable solvent, sonicated for about 1 minute and then placed in a vial containing borate buffered saline (BBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

Without limiting this invention to any particular mechanism or theory, it is believed that the ink binders of the invention can form interpenatrating networks (IPN's) with the lens material of a silicone hydrogel lens. Adhesion of an ink of the invention to the lens by IPN formation does not require the presence of reactive funtional groups in the lens polymer. A color image can be printed directly with an ink of the invention on a preformed silicone hydrogel contact lens to produce a colored contact lens. The printed ink is allowed to penetrate at least partially into the lens material of a contact lens and then cured (cross-linked). The curing can be activated by UV radiation or heat. The binder polymer in the ink is crosslinked in the presence of the lens material of the silicone hydrogel to form IPNs.

Alternatively, a color image can be printed first with an ink of the invention on a mold for making a contact lens and the printed ink is cured to form a colored film. Then, a lens-forming material is dispensed in the mold. The lens-forming material is allowed to pentrate into the cured ink and then be cured to form a colored contact lens onto which the color image is transferred from the mold. The lens material (polymer or polymers) of the colored contact lens is crosslinked in the presence of a polymer (i.e., crosslinked binder polymer in the ink). Preferably, after the step of dispensing the lens-forming material in the mold having the colored film and before the step of curing the lens-forming material in the printed mold, the colored film on the mold is soaked with the lens-forming material for a period of time long enough so that a portion of the lens-forming material penetrates into space between the colored film and the molding surface while detaching the colored film from the molding surface. And then, the lens-forming material in the mold is cured to form a colored contact lens with the colored film embedded in the body of the lens between the anterior and posterior surface of the lens. This will result in a smoother surface and greater comfort as compared to a lens in which the print is directly on the lens surface.

Factors which might influence print quality and adhesion of ink to lenses include but are not limited to molecular weight, molecular weight distribution, composition of the binder polymer, lens composition, solvent type and content in both the lens and the ink. Solvents that swell the lens material are expected to enhance penetration of the binder polymer into the lens. Furthermore, the quantity and particle size characteristics of pigment in inks can also effect print quality and adhesion. It is understood that the printed ink and the lens-forming material can be cured simultaneously in the mold. Inks and lens-forming materials that are amenable to rapid cure are most favorable for such processes (simultaneous curing) since rapid cure kinetics will minimize swearing or loss of ink patterns. Process conditions and the type of printing process empolyed is also expected to influence print quality and possibly adhesion of ink to a lens. In the case of pad printing, factors such as printing speed, type of rubber in print pads, durometer of print pads, type of cliche (e.g. metal, ceramic, plastic) and type of ink cup (e.g. open or closed) are all expected to have some influence on print quality.

However, adhesion between lenses and ink could occur by mechanisms other than IPNs. Where lens materials contain certain types of functionality, direct linkage (bond formation) between binder polymer and lens polymer is possible. For example, lens polymer that contains UV-curable groups (vinyl functionality) would enhance direct linkage of photocurable ink binder to the lens polymer. Nucleophilic addition reactions would also provide another mode of linking ink binder to lenses. For example, lenses that contain nucleophilic groups (e.g. R—SH) could undergoe Michael addition reactions with pendant methacrylate groups in binder polymer. Alternatively binder polymer containing nucleophilic groups (e.g. RSH, NHR*$_2$, R=Alkyl, R*=H, Alkyl) could undergo Michael addition reactions with lens polymer that contains groups such as acrylate or methacrylate. Such reactions would bond the ink to the lens. Furthermore, binder polymer containing nucleophilic groups could undergo reactions with lens polymer that contains electrophilic groups such as epoxy, anhydride, alkyl halide and isocyanate. Alternatively one could bind ink to lenses by having electrophilic groups in the ink binder polymer and nucleophic groups in the lens polymer. Curable inks could also be made be incorporating both nucleophilic and electrophilic functionality into to binder polymer. For example, one could prepare a curable silicone hydrogel ink binder by copolymerizing DMA with TRIS, glycidlymethacrylate, monomethacrylated polydimethylsiloxane and 2-(dimethylamino)ethylacrylate. Under appropriate conditions, the dimethylamino functional groups will react with epoxy functionality in the resulting binder polymer.

In a preferred embodiment, the ink of the present invention has a good transferability from a mold to a contact lens. A "good transferability from a mold to a contact lens" in reference to an ink means that a color image printed on a molding surface of a mold with the ink can be transferred completely onto a contact lens cured in that mold. The ink will also have good transferability from a cliche to a print pad and from a print pad to a lens mold or lens. The composition of the ink, solvent type, binder composition, molecular weight of binder polymer, molecular weight distribution of binder polymer, print pad (type of rubber and printing speed), and the nature of the lens and lens mold surfaces will have an impact on print quality. For example, in processes where printing speed is relatively slow and an inked cliche is exposed to air for relatively long cycle time it will be desirable to have inks in solvents with relatively high boiling points. The high boiling point solvents will minimize premature drying of inks in cliches.

The ink of the present invention typically comprises a solvent, a colorant, and a photo-curable or thermo-curable binder polymer including ethylenically unsaturated groups and segments derived from at least one silicone-containing vinylic monomer or macromer.

A solvent can be water, an organic or inorganic solvent, a mixture of several organic solvents, or a mixture of water and one or more water soluble or water miscible organic solvents. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, 2-ethyoxyethanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethyl lactate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

Non-Pearlescent Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art. In the case of pearlescent pigments it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlscent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

A photo-curable or thermo-curable binder polymer of the invention includes ethylenically unsaturated groups and segments derived from at least one silicone-containing vinylic monomer or macromer. Preferably, the photo-curable or thermo-curable binder polymer of the invention further includes hydrophilic segments derived from at least one hydrophilic vinylic monomer.

In accordance with the present invention, the photo-curable or thermo-curable binder polymer of the invention is an ethylenically functionalized derivative of a silicon-containing polymer having pendant functional groups, preferably selected from the group consisting of hydroxyl groups (—OH), primary amino groups (—NH$_2$), secondary amino groups (—NHR), carboxylic groups (—COOH), epoxy groups, aldehyde groups (—CHO), amide groups (—CONH$_2$), acid halide groups (—COX, X=Cl, Br, or I), isothiocyanate groups, isocyanate groups, halide groups (—X, X=Cl, Br, or I), acid anhydride groups, and combinations thereof.

The term "ethylenically functionalized" as used herein is intended to describe the introduction of ethylenically unsaturated groups into the silicone-containing polymer with pendant functional groups.

The silicone-containing polymer is preferably a copolymerization product of a polymerizable composition, which comprises (a) at least one hydrophilic vinylic monomer, (b) at least one functionalizing vinylic monomer containing at least one functional group, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent.

Examples of siloxane-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, monoacrylated polydimethylsiloxane, mercapto-terminated polydimethylsiloxane, N-[tris(trimethylsiloxy) silylpropyl]acrylamide, N-[tris(trimethylsiloxy)silylpropyl] methacrylamide, and tristrimethylsilyloxysilylpropyl methacrylate (TRIS). A preferred siloxane-containing monomer is TRIS, which is referred to 3-methacryloxypropyltris (trimethylsiloxy) silane, and represented by CAS No. 17096-07-0. The term "TRIS" also includes dimers of 3-methacryloxypropyltris(trimethylsiloxy) silane. Monomethacrylated or monoacrylated polydimethylsiloxanes of various molecular weight could be used. For photo-curable binder polymer, the silicon containing monomers used in the prepartion of binder polymer will preferably have good hydrolytic (or nucleophilic) stability. The alkoxy silane monomers used in the preparation of photo-curable binder polymer preferably will not react with water (or not undergo significant reaction with water.

Any know suitable siloxane-containing macromer can be used to prepare soft contact lenses. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylate, acrylamide, methacrylamide, allyl alcohol, vinylpyridine, N-(1, 1dimethyl-3-oxobutyl)acrylamide, acrylic acid, and methacrylic acid.

Any know suitable vinylic monomer containing at least one functional group can be used as functionalizing vinylic monomer in the present invention. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchoride.

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the present invention, the ethylenically functionalized derivative of a silicon-containing polymer having pendant functional groups is a reaction product of the silicon-containing polymer with an ethylenically functionalizing agent which comprises an ethylencially unsaturated group and a group capable of reacting with the functional groups of the silicone-containing polymer to form covalent linkages. It is well known in the art that a pair of matching functional groups can form a covalent bond or linkage under known reaction conditions, such as, oxidation-reduction conditions, dehydration condensation conditions, addition conditions, substitution (or displacement) conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, a hydroxyl, amino (primary or secondary) or acid group is covalently bondable with isocyanate group; an amino group is covalently bondable with aldehyde (Schiff base which is formed from aldehyde group and amino group may further be reduced); and a hydroxyl or amino group is covalently bondable with carboxyl group.

Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Schemes 1-7 illustrate two stage processes for preparing preferred photo-curable or thermo-curable binder polymer of the invention. In the first stage, a copolymerization reaction is initiated by heat in a polymerizable composition which includes a solvent (e.g, ethylacetate), a thermal initiator (e.g., AIBN), a chain transfer agent (e.g., mercaptoethanol), a hydrophilic vinylic monomer devoid of functional groups (e.g. DMA), a vinylic monomer having at least least one functional groups (e.g. HEMA, MAA, or glycidylmethacrylate), an alkoxysilane monomer (e.g. TRIS), and monomethacrylated polydimethylsiloxane. It is understood that the copolymerization can be initiated with either heat or UV light. In the second stage of the process, the silicone-containing polymer is converted to a photo-curable or thermo-curable binder polymer.

The ink of the invention can further comprise polymerizable components such as DMA, TRIS, and PDMS-MA (monomethacryloxypropyl-terminated polydimethylsiloxane) in order to enhance its compatibility with silicone hydrogels.

The ink of the invention can also be cured with the aide of a thermal initiator or preferably a photoinitiator. Any suitable photoinitiators can be used in the ink formulations. Examples of photoinitiators include but are not limited to Irgacure 2959, Irgacure 907, Irgacure 500, Irgacure 651, Irgacure 369, Daracure 1173, and Daracure 4265. In addition, combinations of initiators can be used. Pigments in ink formulations can block or reduce the amount of UV light that reaches photo-curable groups in ink formulations thereby reducing cure speed. Photo-initiators that have a broad UV absorption spectrum can be used to help alleviate such problems. For example Irgacure 907 and Irgacure 369 have strong UV absorption in longer UV regions and are effective in curing dark inks. Irgacure and Darcure initiators are available from CIBA specialty chemicals. Additional initiators include VAZO-52, VAZO-64, VAZO-67, and VAZO 88. Photosensitizers can also be added to an ink to facilitate photocuring of the ink.

The kinetics of ink curing can be tuned by varying the amount and type of ethylenically unsaturated groups in the binder polymer. For example, increasing the amount of methacrylate groups in the binder polymer will decrease the time required for an ink to gel under a given set of cure conditions. The reactivity of a binder polymer with a given amount of ethylenically unsaturated groups can be increased by using acrylate groups rather than methacrylate groups.

By changing the amount of ethylenically unsaturated groups in a binder polymer, one can also control the modulus of a cured ink (i.e., a colored coat or film) on a silicone hydrogel contact lens. For example, decreasing the amount of ethylenically unsaturated groups in a binder polymer will allow the ink modulus to be lowered. This feature will allow some degree of control over effects of a cured ink upon the modulus of a colored silicon hydrogel contact lens. Other properties of the ink can be tuned by adjusting the ratio of hydrophilic and hydrophobic components in the binder polymer formulation. Such adjustments allow for a better property match between the ink and lens, for example, such as swelling characteristics.

The ink of the invention can further comprise one or more components selected from the group consisting of surfactant, humectant, antimicrobial agents, antioxidant agents, anti-coagulating agents, and other additives known in the art.

In a preferred embodiment of the invention, an ink of the invention comprises: a solvent in an amount of from about 10% and 99% by weight, preferably from about 20% and 95% by weight, more preferably from about 30% and 80% by weight; a photocurable or thermocurable binder polymer in an amount of from about 1% to about 90% by weight, preferably from about 10% to about 80% by weight, more preferably from about 25% to about 75% by weight; a colorant in an amount of from about 0.0 to about 25% by weight, preferably from about 0.05% to about 20% by weight, more preferably from about 0.1% to 15% by weight; and a polymerization initiator in an amount of from about 0 to about 5% by weight, preferably from about 0.02% to about 2.5% by weight, more preferably from about 0.05% to 2.0% by weight.

Although the inks disclosed here are designed for use with silicone hydrogel lenses, they could be used with non-silicone hydrogels of appropriate composition (e.g. low water content formulations).

Inks of the invention have several unique features. First, they are photo-curable or thermal curable (thermo-curable). Such feature can provide manufacturer flexibility in designing a manufacturing process of colored silicone hydrogel contact lenses. Second, curing kinetics of inks can be controllable by varying photo-initiator structure, the amount of ethylenically unsaturated groups in a binder polymer and the type of ethylenically unsaturated groups (e.g. methacrylate cures slower than acrylate) in the binder polymer. Third, inks of the invention can be used to make lenses with multiple prints, because a printed ink can be photocured at a relatively fast rate and no significant down-time would occur between two prints. Inks used to produce lenses with multiple prints can be cured simulatanously or separately as needed. Fourth, inks of the invention would not have a significantly adverse effects upon the oxygen permeability of a colored silicone hydrogel contact lens.

This invention is also directed to methods for making colored silicone hydrogel contact lenses.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink comprising at least one colorant and a photo-curable or thermo-curable binder polymer which comprises ethylenically unsaturated groups and segments derived from at least one silicone-containing vinylic monomer or macromer; and (c) curing the ink, thereby causing the color coat to adhere to the lens.

In a further aspect, the present invention comprises a method for making a colored silicone hydrogel contact lens, comprising the steps of: (a) applying a color coat to at least a portion of at least one of molding surfaces of a lens mold with an ink comprising at least one colorant and a photo-curable or thermo-curable binder polymer which comprises ethylenically unsaturated groups and segments derived from at least one silicone-containing vinylic monomer or macromer, wherein the mold has a lens-forming cavity between the molding surfaces, wherein the colored coat contains a first surface exposed to the interior of the lens-forming cavity and a second surface in contact with the molding surface; (b) dispensing a lens-forming material into the lens-forming cavity of the mold while maintaining substantially the color coat in position; (c) curing the lens-forming material within the lens-forming cavity to form the contact lens, whereby the colored coat detaches from the molding surface and becomes integral with the body of the colored contact lens.

Where an ink is applied first to a molding surface of a mold to form a colored coat on the molding surface, the ink can be cured prior to dispensing of a lens-forming material into the printed mold. Alternatively, the ink can be cured simultaneously with the lens-forming material in the lens-forming cavity of the printed mold to form the colored contact lens. In the case of printing molds, the ink on the printed mold would be transferred to the lens after the lens-forming material is cured in the printed mold.

An ink can be applied to a contact lens or a molding surface of a mold according to any printing technologies, such as, for example, pad transfer printing (or pad printing), or inkjet printing. It is understood that other types of printing technologies could also be used to print lenses and or molds.

In pad-transfer printing, a color image is placed or printed on a pad transfer device and the image on the pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art. Inks for pad printing operations will preferably have one or more of the following characteristics: viscosity lower than about 50,000 cps, preferably lower than about 5000 cps and most preferably below 1500 cps, particle size less than about 5 µm (for non-pearlescent pigment), surface tension from about 20 mN/m to about 60 mN/m; prolonged stability (i.e., stable for about 4 hours, preferably at least 8 hours, more preferably 24 hours, even more preferably at least 7 days, most preferably at least three weeks); an appropriate color level (visible by eye); good adhesion to medical devices; and good transfer from a mold to a medical device made in the mold. The physical stability of an ink could differ from its chemical stability. For example, pigments might settle from the ink (physical phenomenon) yet the ink may not have undergone any significant chemical reaction. For such situations the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

It should be understood that the inks and binder polymers of the invention can be used not only in pad printing operations but also in ink jet printing operations. However, formulation adjustment would need for ink jet printing operations. For ink jet applications, the ink of the invention has one or more of the following characteristics: a viscosity lower than about 50 centipoise (cps), preferably lower than about 15 cps; most preferably below 15 cps; a surface tension of from about 20 mN/m to about 60 mN/m; a particle size of less than about 5 µm; prolonged stability (i.e., stable for at about 4 hours, preferably at least 8 hours, more preferably at least 24 hours, even more preferably at least 7 days, most preferably at least three weeks); an appropriate color level (visible by eye); uniform drop formation (i.e., no "coffee stain" or "donut" effects); jet stability (i.e., ease of formation of individual drops); good adhesion to medical devices; good transfer from a mold to a medical device made in the mold; and stability of ink in inkjet nozzles (minimal drying or crusting effects).

"Coffee stain appearance" or "coffee stain effect", as used herein, means that a color dot on a contact lens or a mold has a peripheral edge having a dark color and the interior area having light color.

"Donut appearance" or "donut effect", as used herein, means that a color dot on a contact lens or a mold has a light-colored or colorless central zone surrounded by a dark-colored annular zone.

Printing a lens using an inkjet printing process is described in published US Patent Application Nos. 2001/0050753, 2001/0085934, 2003/0119943, and 2003/0184710, herein incorporated by references in their entireties.

In still a further aspect, the present invention provides a method of making a colored contact lens with an image embedded therein. This method comprises the steps of: (a) applying a color coat to at least a portion of at least one of molding surfaces of a lens mold with an ink comprising at least one colorant and a photo-curable or thermo-curable binder polymer, wherein the mold has a lens-forming cavity between the molding surfaces; (b) thermally or actinically curing the colored coat to form a colored film which is not covalently attached to any molding surfaces; (c) dispensing a lens-forming material into the lens-forming cavity of the mold; (d) letting the lens-forming material to soak the colored film for a period of time sufficient so that a portion of the lens-forming material penetrates into space between the colored film and the molding surface while detaching the colored film from the molding surface; (e) curing the lens-forming material within the lens-forming cavity to form the contact lens, whereby the colored film is embedded within the body of the contact lens between the anterior and posterior surfaces of the colored contact lens.

The colored film is soaked with the lens-forming material preferably for at least 5 minutes, more preferably for at least 10 minutes and even more preferably for at least 20 minutes.

In this aspect of the invention, any ink suitable for making colored contact lenses as long as it can be cured chemically, thermally or actinically (e.g., UV radiation) to form a colored film on the mold. An ink can comprise at least one colorant, a binder polymer, an adhesion promoter, and optionally a diluent. Preferably, the ink is an ink of the invention described above.

In accordance with this aspect of the invention, a binder polymer comprises latent crosslinkable groups selected from the group consisting of hydroxyl group —OH, amino group —NHR (wherein R is hydrogen or $C_1$ to $C_8$ alkyl), carboxylic group —COOH, epoxy group, amide group —CONHR, isocyanate group, peroxy group, perester group, anhydride group, alkoxysilane group, silanol group, acetoxysilane group, silane group, halosilane group, and combinations thereof.

Alkoxysilanes, acetoxysilanes, silanes, or halosilanes form silanols upon exposure to moisture, namely under moisture-activated crosslinking (curing). The silanols react with each other to form siloxane bonds. Therefore, binder polymer chains containing pendant silanol groups (or precursors) can combine to form crosslinks through the formation of siloxane linkages. Being moisture activated, the crosslinks would form during hydration of the polymer. The preferred latent crosslinkable pendant groups are halosilane and alkoxysilane, with alkoxysilane being the most preferred.

Halosilanes can form siloxane bonds by being exposed to alkoxy silane, metal oxides (e.g., calcium oxide, magnesium oxide, zinc oxide, copper oxide, etc.) and alcohol+carboxylic acid.

Alkoxysilanes can combine with each other to form siloxane bonds. Crosslinking and curing of silicones is well known (see W. Noll, Chemistry and Technology of Silicones, Academic Press, Inc., London).

In addition, alkoxysilanes also form siloxane bonds when exposed to silanols, acetoxysilanes, carboxylic acids, and acids such as HCl. Hydrolytic and non-hydrolytic reactions in which siloxane bonds are formed could be used to introduce crosslinks into the color coating once it is applied to the lens. When water is applied to the lens during the hydration step, crosslinking reactions are initiated, thereby causing the color coat to adhere to the lens.

Preferably, a latent crosslinkable halosilane or alkoxysilane group has of the formula (I):

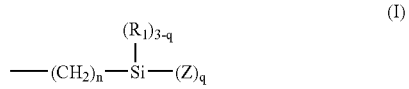

wherein n is an integer from 0 to 12; Z is either a halide or —OR$_2$; each R$_1$ is, independently of any other, a halide, or a substituted or unsubstituted C$_{1-6}$ alkyl group; R$_2$ is, independently of any other, a substituted or unsubstituted C$_{1-6}$ alkyl group, q is an integer from 1 to 3 and n is an integer from 1 to 12 (preferably from 1 to 6 and more preferably from 2 to 4).

Typical examples of the alkoxysilane compound (Z is —OR$_2$ in the above formula) include, but are not limited to: methacryloxyethyltri-methoxysilane, methacryloxyethylmethyldimethoxysilane, methacryloxyethyldi-methylmethoxysilane, methacryloxyethyltriethoxysilane, methacryloxyethyl-methyldiethoxysilane, methacryloxyethyldimethylethoxysilane, methacryloxy-propyltrimethoxysilane, methacryloxypropylmethyldimethoxysilane, methacryl-oxypropyldimethylmethoxysilane, methacryloxypropyltriethoxysilane, methacryloxypropylmethyldiethoxysilane, methacryloxypropyldimethylethoxysilane, styryl-ethyltrimethoxysilane, and 3-(N-styrlmethyl-2-aminoethylamino) propyltri-methoxysilane hydrochloride. These compounds may be used alone or in combination as a mixture of two or more of them.

R$_2$ is preferably an unsubstituted C$_{1-6}$ alkyl; more preferably an unsubstituted C$_{1-4}$ alkyl; more preferably an unsubstituted C$_{1-2}$ alkyl; and most preferably a methyl group. While it is presently preferred that the above-mentioned R$_2$ be unsubstituted alkyl, it should be apparent to one of ordinary skill in the art that any of the above-mentioned preferable R$_2$ group could also be substituted as long as such substitution did not interfere with the invention as described herein. Furthermore, it is preferable that each R$_2$ be the same as other R$_2$ (if any) present.

The preferred alkoxysilane compounds are methoxysilanes (Z is —OR$_2$ and R$_2$ is methyl). The preferred methoxysilanes include methacryloxyethyltri-methoxysilane, methacryloxyethylmethyldimethoxysilane, and methacryloxyethyl-dimethylethoxysilane.

If Z is a halide, the preferred halide is chloride. Likewise, it is preferable that each Z be the same as other Z (if any) present. Preferred examples of the polymerizable halosilane compound of the above formula (I) include, but are not limited to: methacryloxypropylmethyldichlorosilane, methacryloxypropyltrichloro-silane, 3-methacryloxypropyldimethyl-chlorosilane, and methacryloxyethyltri-chlorosilane.

In the above formula, q can be suitably determined by taking the reactivity for the condensation reaction into consideration.

An "adhesion promoter" refers to a compound (or crosslinker) comprising two or more functional groups. A crosslinker molecule can be used to crosslink two or more monomers or polymer molecules. Many different crosslinking reactions could be used to cause chemical bonding between different binder polymer molecules to entrap the pigmented particles. Most crosslinkers are identified by bi- or multi-functional reactive groups. For example, diphenolic, diepoxide, dimelamine, diisocyanate, or dialdehyde resins could be used. Multi-functional phenolics have structures as follows:(HOH$_2$CPh)$_n$—R$_9$, where Ph is a phenol group. Multi-functional epoxides have structures as follows: (CH$_2$OCH)$_n$—R$_9$. Multi-functional aldehydes have the following structure: (HCO)$_n$—R$_9$ or (CH$_3$CO)$_n$—R$_9$. Multi-functional isocyanates have the following structure: (OCN)$_n$—R$_9$. Melamine resins have the following structure: (HOH$_2$C—MeI)$_n$—R$_9$, where MeI is

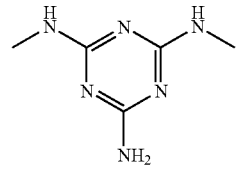

For the above examples, R$_9$ may be a aliphatic, alicyclic, aliphatic-alicyclic, aromatic, aliphatic-aromatic hydrocarbon, vinyl alcohol, vinyl butyral, or vinyl acetate, and n is a number greater than 1. Mixed functional groups could be used (i.e. an epoxide with an isocyanate).

Exemplary isocyanate compounds include hexamethylene diisocyanate (HMDI), 2,4-toluene diisocyanate and bis(isocyanato pheyl)methane.

Exemplary epoxide-containing groups include bisphenol, diepoxide, and epichlorhydrin.

In accordance with the invention, a diluent can be a solvent or a solution of one or more vinylic monomers.

The ink can further comprise one or more components selected from the group consisting of a thermal initiator, a photoinitiator surfactant, humectant, antimicrobial agents, antioxidant agents, anti-coagulating agents, and other additives known in the art.

This invention has utility for production of colored silicone hydrogel contact lenses. Such lenses can be extended-wear contact lenses, daily-wear contact lenses, and/or ocular prosthetic devices.

Binder polymers of the invention can also find use as a lens-forming material in producing silicone hydrogel lenses for daily wear or extended wear modality. In addition, the binder polymers of the invention could also find use as intraocular lenses (IOL's), medical coatings (e.g. coatings for syringe needles, catheters), wound treatment, breathable paints, and breathable coatings. Improved breath ability in paints would likely decrease blistering and/or peeling due to moisture migrating out of wood or other surfaces.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

This example describes synthesis of a precursor to a photo-curable binder polymer and synthesis of a photo-curable binder polymer.

Synthesis of a Silicone-Containing Polymer Having Pendant Functional Groups

A1: A 1 liter jacketed glass reaction kettle is charged with a solution consisting of VAZO-64 (0.6472 grams), DMA (106.09 g), TRIS (106.26 g), mercaptoethanol (0.253 g), HEMA (37.55 g) and ethylacetate (301.9 g). Nitrogen is bubbled through the mixture for about 15 minutes at room temperature and then the mixture is heated to 40° C. and stirred at about 200 RPM. After about 16 hours, the reaction mixture becomes noticeably more viscous. The reaction is monitored by FT-IR analysis. After a total reaction time of about 20 hours, a solution consisting of 11 mg 4-hydroxy-TEMPO (4-Hydroxy-2,2,6,6-Tetramethylpiperidinyloxy, free radical) and 2.38 grams of ethylacetate is added to the reaction mixture. Gravimetric analysis of the reaction mixture indicates that the solution has a solids content of about 68%.

B1: A 1 liter jacketed glass reaction kettle is charged with a solution consisting of VAZO-64 (0.6298 grams), DMA (100.13 g), TRIS (95.16 g), mercaptoethanol (0.259 g), HEMA (37.58 g), monomethacryloxypropyl-terminated polydimethylsiloxane (17.54 g) (an average molecular weight of about 5000 and from Gelest, Inc of Tullytown, Pa.) and ethylacetate (329 g). Nitrogen is bubbled through the mixture for about 20 minutes at room temperature and then the mixture is heated heated to 40° C. and stirred at about 200 RPM for about 28 hours. The reaction mixture is concentrated by rotary evaporation (bath temp ~40° C.) until the percent solids is 69% by gravimetric analysis.

FT-IR analysis: A several drops of a reaction mixture (A1 or B1) are placed in about 15 mL of hexanes and the resulting precipitate is separated from the hexanes and dissolved in absolute ethanol. A film is cast on a NaCl disk and dried at 75° C. for about 5 minutes (or at 100° C. for about 10 minutes). Characteristic peaks of amide and ester and hydroxy functionality at 1643.7, 1724.4 and 3421 $cm^{-1}$ respectively are monitored.

C1: A one liter jacketed glass kettle is charged with DMA (250.03 g), TRIS (200.04 g), HEMA (75.08 g), mercaptoethanol (0.5582 g), monomethacryloxypropyl terminated polydimethylsiloxane (25.02 g), VAZO-64 (1.0005 g), and ethyl acetate (600 g). Nitrogen is bubbled through the mixture for several minutes at room temperature and then the mixture is heated at 40° C. and stirred at about 250 RPM. After about 18 hours the reaction mixture becomes noticeably more viscous. The reaction is heated at 40° C. for a total of about 24 hours and then allowed to cool to room temperature. The monomethacryloxypropyl terminated polydimethylsiloxane used in this procedure has an average MW of about 5000 and was purchased from Gelest, Inc of Tullytown, Pa.

FT-IR analysis: Several drops of the reaction mixture (C1) are placed in 5 mL of hexanes. The resulting precipitate is dissolved in isopropanol (~3 mL) and a film is cast on a NaCl disk and dried at 80° C. for several minutes. Characteristic peaks of hydroxyl, ester and amide functionality at 3417, 1724, and 1646 $cm^{-1}$ are observed in the spectrum.

Preparation of Photo-Curable Binder Polymer

A2: To 150.17 grams of a 68% solution of a silicone-containing polymer A1 (a precursor prepared above) in ethyl acetate is added a solution consisting of 18.8029 grams of 2-isocyanatoethylmethacrylate (IEM) and 0.0035 grams of 4-hydroxy-TEMPO. The mixture is stirred with a spatula at room temperature until homogenous and then checked by FT-IR. 0.0705 grams of Dibutyltindilaurate (DBTDL) is then stirred into the reaction mixture. The reaction mixture is heated at 35° C. for about 45 minutes at which point NCO is no longer present by FT-IR.

B2: To 58 grams of a 69% solution of a silicone-containing polymer B1 (a precursor prepared above) in ethyl acetate is added a solution consisting of 6.13 grams of 2-isocyanatoethylmethacrylate (IEM), 0.035 grams of DBTDL and 0.0020 grams of 4-hydroxy-TEMPO. The mixture is stirred until homogenous and then heated at 40° C. (~75 minutes) until isocyanate is no longer present by FT-IR.

C2: To 550 grams of copolymer C1 in about 600 grams of ethyl acetate is added 58.5 mg of 4-hydroxy-TEMPO dissolved in about 5 mL of ethyl acetate. The copolymer mixture is then mixed for about 30 minutes. To this mixture is added to a solution consisting of about 0.364 grams of DBTDL and 76.19 grams of 2-isocyanatoethylmethacrylate. The reaction mixture is stirred and heated at 45° C. (~60 minutes) until isocyanate is no longer present by FT-IR. The percent solids of the copolymer solution is found to be about 54% by gravimetric analysis. Three inks (ink-3, Ink-4, Ink-5) are prepared from the 54% solids solution of copolymer C2 in ethyl acetate. Inks were prepared by adding solvent, PCN-green and photo-initiator to 54% copolymer C2 in ethyl acetate. Ink formulations are described in the ink formulation section.

EXAMPLE 2

This example illustrates that a binder polymer of the invention can be used as a prepolymer in a lens-forming material for making silicone hydrogel lenses.

Lens Preparation From Binder Polymer A2. To 25.06 grams of binder polymer A2 (as prepolymer, prepared in Example 1) solution is added 0.0142 grams of Irgacure 2959. The sample is mixed until homogeneous. Polypropylene molds (FreshLook) are filled with about 75 microliters of sample and irradiated with 1.8 $mW/cm^2$ UV light (Grobel lamp) for 30 seconds. Clear hydrogel lenses are placed in BBS (Borate buffered Saline, FreshLook packaging solution) and autoclave sterilized. The water content of the lenses is about 25% by gravimetric analysis.

Lens Preparation From Binder Polymer B2. To about 13 grams of binder polymer B2 (as prepolymer, prepared in Example 1) solution is added Irgacure 2959 (0.00749 g) and 1 gram of ethylacetate. The sample is mixed until homogenous. Polypropylene lens (FreshLook) molds are filled with the sample. The filled molds are then irradiated at 2.5 $mW/cm^2$ for about 10 seconds. Slightly hazy hydrogel lenses are retrieved from the molds, placed in BBS and sterilized. The lenses has a water content of 19% (+/−5%). Deionized water forms an advancing contact angel of 109° and a receding angel of 69° on the lens.

Lens Preparation from Binder Polymer C2

A lens forming material (LF-4) for making silcone hydrogel contact lenses is prepared by mixing 18.04 grams of a 61% solution of binder polymer C2 in ethanol (ethyl acetate in binder polymer C2 is exchanged with ethanol as described in the preparation of INK-6) with a solution consisting of 0.0192 grams of Irgacure 2959 in 2.03 grams of ethanol. After mixing and centrifugation, visocosity of the resulting polymer solution is about 1310 cps at 25.0° C. Polypropylene lens (FreshLook) molds are filled with the sample. The filled molds are then irradiated at 2.02 $mW/cm^2$ for about 10 seconds. Hydrogel lenses are retrieved from the molds, placed in BBS and sterilized. The lenses have a water content of about 21%.

EXAMPLE 3

Synthesis of Silicone-Containing Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

EXAMPLE 4

This example illustrates preparation of inks and colored silicone hydrogel contact lenses.

Ink Preparation

INK-1: A photo-curable ink is prepared by mixing 7.51 grams of LF-1, 2.51 grams of PCN blue and 15 grams of ethyl acetate.

INK-2: A photocurable ink is prepared by mixing 22.64 grams of the binder polymer A with 1.38 grams of PCN-green, and 0.0581 grams of Irgacure 2959 dissolved in 1.5 grams of ethyl acetate. The ink has a Brookfield viscosity of about 680 cps at 25° C.

INK-3 to INK-5: Formulations for INK-3 to INK-5 are prepared by mixing binder polymer C2 as a 54% solids solution with solvent, initiator, and PCN-green. Formulations, viscosity and observations made during manual printing are given below.

| Components | Ink-3 | Ink-4 | Ink-5 |
|---|---|---|---|
| Copolymer C2 (54% solids in ethyl acetate) | 14.00 (g) | 14.05 (g) | 14.00 (g) |
| Ethanol | N/A | N/A | 4.82 (g) |

-continued

| Components | Ink-3 | Ink-4 | Ink-5 |
|---|---|---|---|
| Ethyl acetate | 4.85 (g) | N/A | N/A |
| Cyclopentanone | N/A | 4.83 (g) | N/A |
| PCN-Green | 0.8073 (g) | 0.8011 (g) | 0.8084 (g) |
| Daracure 1173 | 0.450 (g) | 0.5183 (g) | 0.4205 (g) |
| Viscosity (cps) at 25.0° C. | 264 (g) | 491 (g) | 289 (g) |
| Manual Pad Printing performance | a | b | c | a. Difficulty in transferring ink from cliche to print pad. Solvent appears to dry too quickly.
b. Ink transfers from cliche to pad and from pad to mold.
c. Ink transfers from cliche to pad and from pad to mold.

INK-6: About 540 grams of Photo-Curable Copolymer C2 as a 54% solution in ethyl acetate is concentrated by rotary evaporation (bath temperature ~45° C.) until ethyl acetate is no longer observed condensing in a solvent trap. Ethyl acetate in the concentrated copolymer solution is exchanged with ethanol by repeated addition of ethanol to the solution followed by solvent stripping. Concentrated copolymer solution is diluted with about 100 mL of ethanol and then subjected to solvent stripping using a rotary evaporator. The addition of 100 mL portions of ethanol followed by solvent stripping is repeated about six times. The percent solids of the copolymer solution is then determined to be about 61%. An ink is prepared by combining about 40.28 grams of the 61% solids copolymer with a green pigment paste and 1.29 grams of Daracure 1173. The green pigment paste is prepared by milling (ball mill) a mixture consisting of about 49.4 grams of $Cr_2O_3$, 0.2 grams of PCN blue and 187.7 grams of ethanol for about 17 hours at which point about 99% of the particles are less than about 5 microns.

Lens-Forming Material

LF-1: A lens-forming material for making silicone hydrogel contact lenses is prepared by mixing 25.06 grams of binder polymer A2 (as prepolymer) solution with 0.0142 grams of Irgacure 2959.

LF-2: A lens-forming material for making silicone hydrogel contact lenses is prepared by mixing about 35.8 grams of the binder polymer A2 with 41 mg of Irgacure 2959 and 3 grams of ethylacetate.

LF-3: The siloxane-containing macromer prepared in Example 3 is use in preparation of a lens-forming materia (Lotrafilcon B)I, which comprises 25.92% of the siloxane-containing macromer prepared in Example 3, 19.25% of TRIS, 28.88% of DMA, 24.95% of denatured ethanol, and 1.0% of 2-hydroxy-2-methyl-1-phenyl-o-ene (Daracure 1173).

LF-4: A lens forming material for making silicone hydrogel contact lenses is prepared by mixing 18.04 grams of a 61% solution of binder polymer C2 in ethanol (ethyl acetate in binder polymer C2 is exchanged with ethanol as described in the preparation of INK-6) with a solution consisting of 0.0192 grams of Irgacure 2959 in 2.03 grams of ethanol.

UV Curing Test of Ink. Polypropylene lens molds are filled with about 76 microliters of INK-2. The molds are then closed and irradiated for 45 seconds at 1.9 mW/cm$^2$ of UV light (Grobel Lamp). Upon de-molding, green polymer is obtained. The ink is also cured at 2.4 mW/cm$^2$ for 3 minutes to yield green lenses that are warped.

UV-Curing Test of INK-6: Polypropylene base curve molds are printed with INK-6, and irradiated (Light Sources FS 40T12, UV-B-BP) at about 1.85 mW/cm² (UVPS radiometer with a UVB-1 sensor). Printed molds are irradiated for 0, 5, 10, 30, 45, and 65 minutes and then checked for effectiveness of cure. This is done by soaking the printed molds in ethanol followed by visual inspection of print and print pattern. The results of this test are given below.

| INK-6 Cured on Polypropylene lens molds | |
|---|---|
| Cure Time (minutes) | Observations |
| 0 | Ink washed off mold within 5 minutes |
| 5 | Ink pattern remained intact after soaking for 24 hours in ethanol |
| 10 | Ink pattern remained intact after soaking for 24 hours in ethanol |
| 30 | Ink pattern remained intact after soaking for 24 hours in ethanol |
| 45 | Ink pattern remained intact after soaking for 24 hours in ethanol |
| 65 | Ink pattern remained intact after soaking for 24 hours in ethanol |

Preparation of Colored Silicone Hydrogel lenses

Lens I: Base curve portions of polypropylene lens molds are pad printed with INK-1. Female portions of molds are filled with about 75 microliters of LF-1. The mold halves are combined and closed. The molds are then placed under a UV lamp (Grobel lamp) for 30 seconds and irradiated at 1.8 mW/cm². The water content of the lenses is about 29% by gravimetric analysis. Contact Angle of de-ionized water on the lens is about 108° (advancing angle) and 56° receding angle.

Lens II: (lens samples 1563-76-3): The base curve portions of polypropylene lens molds are pad printed (silicone rubber pad) with INK-2. Female portions of the molds are then filled with about 75 microliters of LF-2 and closed with printed base curve portions of molds. Colored silicone hydrogel lenses are obtained by irradiating the closed molds at 1.9 mW/cm2 for 30 seconds. A Grobel lamp is used for UV-curing. The printed lenses are placed in borate buffered saline (FreshLook packaging solution) and sterilized at 121° C. for 45 minutes. The water content of the lenses is about 23% by gravimetric analysis. Contact Angle of de-ionized water on the lens is about 108° (advancing angle) and 64° receding angle.

Lens III: The base curves of polypropylene lens molds are pad printed with INK-2. The ink is UV-cured in a light box with lights above and below the lens molds. The light box is equipped with Phillips lights (40 watt, F405). The top lights has an intensity of about 3.61 mW/cm² while the bottom lights has an intensity of about 3.54 mW/cm². The ink is cured for about 25 minutes. Female portions of lens molds are filled with about 75 microliters of LF-3 and molds are closed with the based curve molds that has cured ink patterns on their surfaces. Printed lenses are obtained by curing the closed molds for about 2 hours in a UV cure box with the top light intensity of about 3.61 mW/cm² and a bottom light intensity of about 3.54 mW/cm². The printed lenses are hydrated in BBS, and sterilized at 121° C. for 45 minutes. The water content of the lenses is about 36% by gravimetric analysis. Contact Angle of de-ionized water on the lens is about 105° (advancing angle) and 73° receding angle.

Lens IV: Polypropylene base curve lens molds are printed with INK-6. The printed molds are then irradiated (Light Sources FS 40T12, UV-B-BP) at about 1.85 mW/cm² (UVPS radiometer with a UVB-1 sensor) for about 20 minutes. Polypropylene lens front curve mold haves are filled with about 75 microliters of Lotrafilcon-B lens formulation and then the molds are closed with base curve molds containing printed and cured ink. The printed and cured ink is allowed to soak in Lotrafilcon-B for about 20 minutes in closed molds and then the molds are irradiated at 1.85 mW/cm² for about 45 minutes. Molds are opened and printed silicone hydrogel lenses are placed in glass vials containing CIBA Vision Soft-Ware Saline. Lenses are sterilized at about 123° C. for about 60 minutes. Cross sectional analysis of a lens shows the printed ink to be sandwiched between the lens front and back curve surface.

Adhesion Testing of Ink Printed on Silicone Hydrogel Lenses

Lens II: Printed lenses (Lens II) are placed in 5 mL of methanol, sonicated for 1 minute, and then placed in vials containing borate buffered saline (BBS). After about 10 seconds, the saline is drained and about 5 mL of fresh saline is then added to each lens sample. After equilibrating for about 5 minutes in the BBS, lenses are inspected for signs of adhesion failure. There are no signs of adhesion failure even after digitally rubbing lenses.

Lens III: Printed lenses (Lens III) are placed in 5 mL of methanol, sonicated for 1 minute, and then placed in vials containing borate buffered saline (BBS). After about 10 seconds, the saline is drained and about 5 mL of fresh saline is then added to each lens sample. After equilibrating for about 5 minutes in the BBS, lenses are inspected for signs of adhesion failure. There are no signs of adhesion failure even after digitally rubbing lenses.

Lens IV: Printed lenses (Lens IV) are placed in methanol, sonicated for about 30 seconds, and then placed in borate buffered saline (BBS). Lenses are removed from methanol and allowed to equilibrate in BBS for a minimum of 5 minutes. Each lens is rubbed with fingers for about 10 seconds and checked for signs of adhesion failure. There are no signs of adhesion failure even after digitally rubbing lenses. Cross sectional analysis of printed lenses shows that the print pattern is embedded between the lens front curve (anterior) and back curve (posterior) surfaces.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. An ink for making colored silicone hydrogel contact lenses, comprising at least one colorant, a solvent and a photo-curable or thermo-curable silicone-containing binder polymer including ethylenically unsaturated groups and segments derived from at least one silicone-containing vinylic monomer or macromer, wherein the silicon-containing binder polymer is a obtained by (1) copolymerizing a polymerizable composition to obtain a silicone-containing polymer, wherein the polymerizable composition comprising:

(a) at least one hydrophilic vinylic monomer devoid of functional groups;

(b) at least one functionalizing vinylic monomer containing at least one first functional group selected from the group consisting of hydroxyl group, primary amino group, secondary amino group, carboxylic group, epoxy group, aldehyde group, amide group, acid halide group, isothiocyanate group, isocyanate group, halide group, acid anhydride group, and combinations thereof;

(c) at least one silicone-containing vinylic monomer or macromer; and (d) optionally one or more components selected from the group consisting of a polymerization initiator, a chain transfer agent, wherein the silicone-containing polymer comprises first functional groups derived from functionalizing vinylic monomer, and (2) introducing the ethylenically unsaturated groups to the silicone-containing polymer to form the photo- or thermo-curable silicone-containing binder polymer by reacting the silicone-containing polymer with an ethylenically functionalizing agent including ethylenically unsaturated groups and a second functional group, wherein the first functional group of the silicone-containing polymer and second functional group of the ethyleniacally functionalizing agent react with each other to form a covalent linkage, wherein the ink is characterized by having capability to be cured actinically or thermally to form a colored coat on a contact lens, wherein the colored coat has good adhesion to the contact lens without being covalently attached to the lens material of the contact lens.

2. The ink of claim 1, wherein the ink after curing has a good transferability from a mold to a contact lens.

3. The ink of claim 1, wherein the amount of the solvent is from about 10% to 95% by weight, wherein the amount of the binder polymer is from about 1% to about 90% by weight, and wherein the amount of the colorant is about 25% by weight or less.

4. The ink of claim 1, wherein the colorant comprises at least a pigment and/or at least a dye which is either sparingly soluble or insoluble in the solvent.

5. The ink of claim 1, wherein the silicone-containing vinylic monomer is methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl] acrylamide, tristrimethylsilyloxysilylpropyl methacrylate (TRIS), or N-[tris(trimethylsiloxy)silylpropyl]methacrylamide.

6. The ink of claim 1, wherein the functionalizing vinylic monomer is methacrylic acid (MAA), acrylic acid, glycidylmethacrylate, glycidylacrylate, 2-hydroxyethylmethacrylate (HEMA), 2-hydroxyethyl acrylate (HEA), methacrylic anhydride, N-hydroxymethylacrylamide (NHMA), 2-bromoethylmethacrylate, or vinylbenzylchoride.

7. The ink of claim 1, wherein the polymerizable composition further comprises a chain transfer agent selected from the group consisting mercaptoethane, mercaptoethanol, ethanedithiol, propanedithiol, and mercapto-terminated polydimethylsiloxane.

8. The ink of claim of 1, wherein the ethylenically functionalizing agent is glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, or methacrylic anhydride.

* * * * *